Aug. 19, 1952     M. BIGOT     2,607,806
PROCESS FOR THE MANUFACTURE OF ALCOHOL
OF HIGH MOLECULAR WEIGHT
Filed March 9, 1949
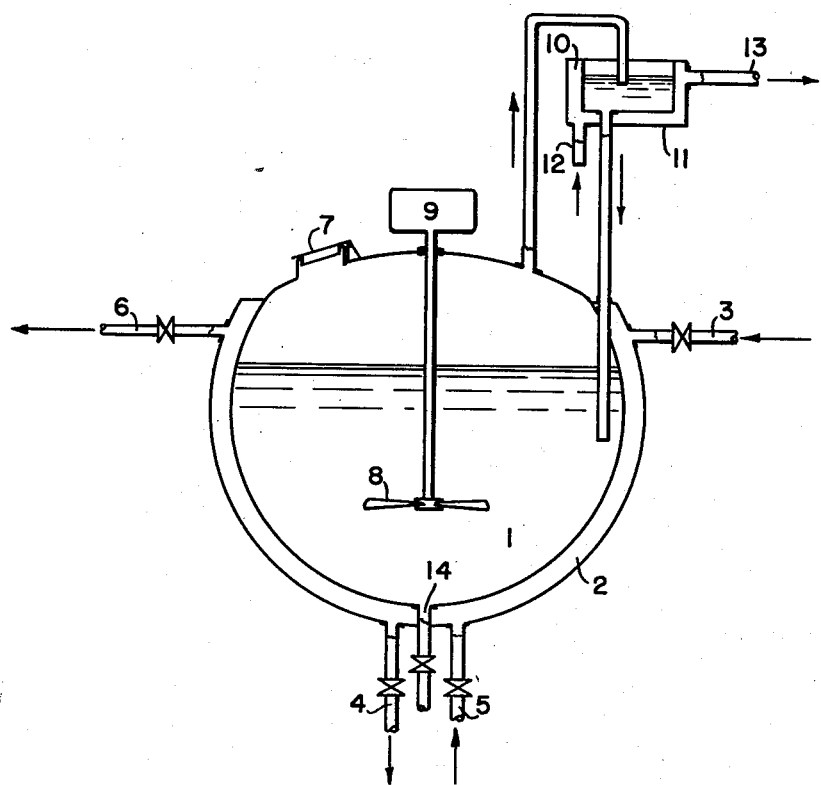
INVENTOR.
MAURICE BIGOT
BY *E. J. Freeman*
ATTORNEY Patented Aug. 19, 1952

2,607,806

UNITED STATES PATENT OFFICE 2,607,806

PROCESS FOR THE MANUFACTURE OF ALCOHOL OF HIGH MOLECULAR WEIGHT

Maurice Bigot, Paris, France, assignor to Societe Anonyme dite: Societe d'Innovations Chimiques dite Sinnova ou Sadic, Meaux-Beauval, France Application March 9, 1949, Serial No. 80,354 In France July 2, 1941

Section 1, Public Law 690, August 8, 1946 Patent expires July 2, 1961

1 Claim. (Cl. 260—638)

This invention relates to the production of high molecular weight alcohols; it is a continuation-in-part of my copending patent application Serial No. 620,622, filed October 5, 1945, and now abandoned.

The invention utilizes the so-called "Bouveault and Blanc" process according to which alcoholic ester solutions are reduced with metallic sodium. This process has not attained practical or industrial usefulness; its failure is due to the hazards of the process and to its insufficient yield.

Many methods have been devised to eliminate these drawbacks.

According to one of these methods the reduction is effected in a closed vessel under hydrogen pressure and with or without the presence of an inert gas; it was thus hoped to avoid losses of hydrogen. According to another known method use is made of a hydrocarbon solvent to which is added an excess or the theoretical quantity of a low molecular weight alcohol in order to produce the hydrogen in contact with the sodium; the losses of solvent are considerable as owing to the viscosity of the reactive mixture it is necessary to work with greatly diluted solutions. According to still another embodiment of the Bouveault and Blanc method finely divided sodium is used; the yield is somewhat increased; but the above mentioned difficulty caused by the use of a hydrocarbon solvent still remains; moreover, the danger of explosions is greatly increased.

The present invention has for its object to remedy the above mentioned drawbacks and to obtain in a simple apparatus an astonishingly high yield of the high molecular and particularly of palmitic and stearic alcohol. To attain this purpose the reactive bodies are rigorously dried in order to reduce their humidity content to less than 0.001 per cent and preferably to less than 0.0001 per cent.

Comparative tests carried-out with reactive mixtures of which the moisture content has been reduced to less than 0.001 per cent and identical mixtures made up with commercial absolute or dry alcohol have proven that by this extreme reduction of the moisture the yield could be raised to practically 100 per cent.

Esters are used in conformity with the invention having an acidity index of less than 20 and preferably less than 10; the formation of alkaline soaps and a partial saponification during the reduction which tends to diminish the yield is hereby prevented. Precautionary measures are taken that the atomic hydrogen formed during the reaction is converted into molecular hydrogen before it reaches the surface of the reactive mixture. For this purpose the reacting liquid is energetically stirred so that the hydrogen is immediately upon its creation distributed throughout the reactive mass and spontaneously enters into reaction; the reaction mixture is preferably heated to a temperature higher than that at which sodium melts but below the boiling point. Use is made of alcoholic ester solutions which are more concentrated than those hitherto utilised and contain at least 20 parts of the ester per 100 parts of alcohol; the reaction is hereby accelerated and the amount of steam for the initial heating of the reactive mixture as well as for the subsequent separation of the solvent by distillation is reduced; the soda lye is recovered in a concentrated form ready for use or sale. An alcohol only slightly soluble in water and in soda is preferably chosen as a solvent, such as, fermentation amyl alcohol.

The accompanying drawing shows, by way of example, an apparatus for carrying-out the process in accordance with the invention.

The apparatus comprises a tank 1 having a substantially spherical shape and a diameter of at least 120 to 140 cm.; the tank is provided with a steam jacket 2, valve provided steam inlet and outlet pipes 3, 4 and water inlet and outlet pipes 5, 6. The tank has an opening closed by a removable cover 7 and a propeller fitted stirrer 8 actuated by motor 9, the stirrer is located at substantially a third of the height of the vessel. A reflux cooler is provided consisting of vessel 10 open to the atmosphere and supplied with a water jacket 11, having a water inlet pipe 12 and discharge pipe 13.

The mixture of the ester, which preferably may be a glyceride, and of a low molecular weight alcohol of which the moisture content has been reduced in conformity with the invention is charged into the vessel 1; the charge is heated by steam until it reaches about 100° C.; then the stirrer is set into action and rotated at a speed of 1500 revolutions per minute so as to impart to the charge a downwardly directed whirling movement; the cover 7 is opened and a sodium cake is introduced; the sodium melts instantaneously and is divided into extremely fine droplets which are immediately distributed throughout the entire lower part of the vessel; each of these droplets forms one or more atomic hydrogen bubbles which are prevented from moving upward by the downwardly directed action of the stirrer. Therefore, the hydrogen bubbles react with the charge before reaching its surface. Since the reaction is exothermic the admission of steam is soon interrupted and is replaced by a circulation of cold water through the tank 1 by means of the pipes 5, 6; further quantities of sodium are introduced through orifice 7 in reaction with the cooling speed so as to allow the temperature of the reactive mixture to rise gradually without however reaching the boiling point; this procedure is continued until the required amount of sodium has been introduced. The reaction mixture remains hereby in a thinly fluid state which promotes the progress of the reaction.

The temperature is then raised to the boiling point and is so maintained for about 20 minutes to make sure that the reaction is completed.

The solution is decanted into another vessel and water is introduced while stirring; the sodium alcoholate is hereby converted into alcohol and soda. The concentrated soda liquid is separated by decantation and systematically washed with diluted soda solution taken from prior operations; these various soda solutions are mixed with the concentrated soda liquid to obtain a solution of 36° Be.

When all the soda has been removed by systematic washing the high molecular weight alcohol and the low molecular weight alcohol which latter has been used as a solvent are separated by distillation; the distilled alcohol is used as a solvent for subsequent treatments.

Two examples for carrying the invention into practice are given below.

*Example 1*

525 parts of cocoanut oil are dissolved in 2000 parts of amyl alcohol obtained from the recovery of a prior operation; the alcohol is very carefully dried to less than 0.001 per cent moisture. The reduction of the ester is effected by fractionated introduction of 200 parts of sodium at a temperature of 110° C.; this temperature is allowed to rise gradually to 150° C. During the entire reduction which lasts about 2 hours the mixture is energetically stirred; it is then cooled to about 110° C. and water is introduced while stirring to decompose the alcoholate. The solution is decanted and washed and the residual alcohol mixture is separated by distillation; the yield obtained is about 99 per cent.

*Example 2*

A similar procedure as described in Example 1 is applied to 200 parts of spermaceti oil having an iodine index of 60-70; the oil is dissolved in 800 parts of amyl alcohol and reduced by means of 41 parts of sodium.

I claim:

In the production of a high molecular weight alcohol by the reaction of a solution of a high molecular weight aliphatic ester in an amyl alcohol with metallic sodium, the steps of reducing the moisture content of the solution prior to its reaction with the metallic sodium by drying to less than 0.001 per cent, gradually adding the molten sodium to the amyl alcohol solution, stirring the same vigorously to uniformly distribute the thereby produced hydrogen in the solution while controlling the temperature not to exceed the boiling point until the admixture of the sodium has been completed, hereafter raising the temperature above the boiling point and cooling the solution to decompose the alcoholate, whereby an alcohol yield is obtained of about 99.0 per cent.

MAURICE BIGOT.

REFERENCES CITED

The following references are of record in the file of this patent:

UNITED STATES PATENTS

| Number | Name | Date |
| --- | --- | --- |
| 1,971,742 | Bertsch | Aug. 28, 1934 |
| 1,971,743 | Bertsch | Aug. 28, 1934 |
| 2,019,022 | Scott et al. | Oct. 29, 1935 |
| 2,070,318 | Rosser et al. | Feb. 9, 1937 |

FOREIGN PATENTS

| Number | Country | Date |
| --- | --- | --- |
| 417,383 | Great Britain | Sept. 27, 1934 |